(12) United States Patent
Kim et al.

(10) Patent No.: US 10,365,371 B2
(45) Date of Patent: Jul. 30, 2019

(54) MULTI-POSITION SENSING APPARATUS

(71) Applicant: LUMENS CO., LTD., Yongin-si, Gyeonggi-do (KR)

(72) Inventors: Yong-Koang Kim, Hwaseong-si (KR); Yong-Gu Hur, Hwaseong-si (KR); Eun-Sung Shin, Hwaseong-si (KR); Byung-Tak Jang, Yongin-si (KR); Hyun-Ryong Cho, Yongin-si (KR); Dong-Min Yu, Cheonan-si (KR); Ji-Min Her, Ansan-si (KR)

(73) Assignee: LUMENS CO., LTD., Yongin-si (KR)

( * ) Notice: Subject to any disclaimer, the term of this patent is extended or adjusted under 35 U.S.C. 154(b) by 534 days.

(21) Appl. No.: 15/108,306

(22) PCT Filed: Dec. 23, 2014

(86) PCT No.: PCT/KR2014/012735
§ 371 (c)(1),
(2) Date: Jun. 26, 2016

(87) PCT Pub. No.: WO2015/102288
PCT Pub. Date: Jul. 9, 2015

(65) Prior Publication Data
US 2016/0320490 A1   Nov. 3, 2016

(30) Foreign Application Priority Data

Dec. 31, 2013 (KR) .................. 10-2013-0167949
Dec. 31, 2013 (KR) .................. 10-2013-0167954

(51) Int. Cl.
*G01C 3/08* (2006.01)
*G01S 17/48* (2006.01)
*G01S 7/481* (2006.01)

(52) U.S. Cl.
CPC .............. *G01S 17/48* (2013.01); *G01S 7/481* (2013.01)

(58) Field of Classification Search
CPC ......... G01S 7/481; G01S 7/4808; G01S 17/48
(Continued)

(56) References Cited

U.S. PATENT DOCUMENTS 4,701,049 A * 10/1987 Beckman ................ G01S 17/48
                                                                    356/3.07
2016/0364874 A1* 12/2016 Tohme .................. G01S 17/003

FOREIGN PATENT DOCUMENTS

JP   06-281498 A   10/1994
JP   2002-350130 A   12/2002
JP   2013-083886 A   5/2013

OTHER PUBLICATIONS

International Search Report dated Apr. 10, 2015 in PCT/KR2014/012735, 4 pgs.

* cited by examiner

*Primary Examiner* — Mark Hellner
(74) *Attorney, Agent, or Firm* — Mei & Mark LLP

(57) ABSTRACT

The present invention relates to a multi-position sensing apparatus capable of sensing a position and an angle of a target, the apparatus including: a light emitting element that irradiates detection light to a first or second target; a first light receiving part having a first light receiving area in a first light receiving range angle with respect to a first light receiving axis to receive a first or second reflective light reflected from the first or second target; and a second light receiving part having a second light receiving range angle with respect to a second light receiving axis in parallel to the first light receiving axis to receive the second or first reflective light reflected from the second or first target.

20 Claims, 17 Drawing Sheets

(58) Field of Classification Search
USPC .................................................. 356/3.08
See application file for complete search history.

1 Object

1 Object

2 Object

MULTI-POSITION SENSING APPARATUS

CROSS-REFERENCE TO RELATED APPLICATION(S)

This application is the National Stage entry of International Application No. PCT/KR2014/012735, filed on Dec. 23, 2014, claiming priority to Korean Patent Application Nos. 10-2013-0167949, filed on Dec. 31, 2013, 10-2013-0167954, filed on Dec. 31, 2013, the entire contents of which are incorporated herein by reference in their entirety.

TECHNICAL FIELD

The present invention relates to a multi-position sensing apparatus, and more particularly, to a multi-position sensing apparatus capable of sensing a position and an angle of a target.

BACKGROUND ART

In general, contact less sensors capable of sensing a position and an angle of a target by using a camera or various kinds of contactless photo sensors have been developed. For example, motion recognition may be implemented by an image sensor (camera), in which the image sensor extracts a plurality of images during the motion recognition to perform image processing.

DISCLOSURE

Technical Problem

However, the existing contactless sensors cannot but measure only a relative value using signal intensity, and therefore may not accurately determine a height value of the target, that is, a position value in a Z-axis direction.

Further, when at least two targets are present, the existing contactless sensors calculate positions of the targets simply based on only a total of reflective light, and therefore may determine the targets as one or may not respectively.

The present invention proposes to solve several problems including the above-mentioned problems and an object of the present invention is to provide a multi-position sensing apparatus capable of accurately determining a Z-axis position of a target by measuring, by at least one of light receiving parts configured in an array form, an angle representing a height value of the target and accurately determining positions of targets, respectively. However, the problem is exemplary and therefore the scope of the present invention is not limited thereto,

Technical Solution

According to an exemplary embodiment of the present invention, there is provided a multi-position sensing apparatus, including: a light emitting element that irradiates detection light to a first or second target; a first light receiving part having a first light receiving area in a first light receiving range angle with respect to a first light receiving axis to receive a first or second reflective light reflected from the first or second target; and a second light receiving part having a second light receiving area in a second light receiving range angle with respect to a second light receiving axis in parallel to the first light receiving axis to receive second or first reflective light reflected from the second or first target.

A portion of the first light receiving area of the first light receiving part and a portion of the second light receiving area of the second light receiving part may overlap with each other.

The light emitting element may be an infrared LED having a light emitting axis in parallel to the first light receiving axis.

The multi-position sensing apparatus may further include: a body, in which the light emitting element may be installed at a middle of an upper surface of the body, the first light receiving part may be installed at one end portion of the upper surface of the body, and the second light receiving part may be installed at the other end portion of the upper surface of the body.

The multi-position sensing apparatus may further include: a height calculator that receives position and angle signals of the first target from the first light receiving part to output positional information of the first target, receives position and angle signals of the second target from the second light receiving part to output positional information of the second target, and uses a trigonometric function to calculate height values of the first target and the second target when the positional information of the first target and the positional information of the second target approach a reference range.

The multi-position sensing apparatus may further include: a multi-position recognizer that receives position and angle signals of the first target from the first light receiving part to output positional information of the first target, receives position and angle signals of the second target from the second light receiving part to output positional information of the second target, and outputs multi-position values for recognizing the first target and the second target as being separated from each other when the positional information of the target and the positional information of the second target are out of the reference range.

The multi-position sensing apparatus may further include: a third light receiving part that has a third light receiving area in a third light receiving range angle with respect to a third light receiving axis in parallel to the first light receiving axis to receive the first reflective light or the second reflective light reflected from the first target or the second target, in which the first light receiving part, the second light receiving part, and the third light receiving part may be each disposed at an equal angle of 120° with respect to the light receiving element.

The multi-position sensing apparatus may further include: a third light receiving part that has the third light receiving area in the third light receiving range angle with respect to a third light receiving axis in parallel to the first light receiving axis to receive first reflective light or second reflective light reflected from the first target or the second target and a fourth light receiving part that has a fourth light receiving area in a fourth light receiving range angle with respect to a fourth light receiving axis in parallel to the first light receiving axis to receive the first reflective light or the second reflective light reflected from the first target or the second target, in which the first light receiving part, the second light receiving part, the third light receiving part, and the fourth light receiving part may be each disposed at an equal angle of 90° with respect to the light receiving element.

The first light receiving part may include a first photo diode that uses first barrier ribs having a height to change a transmitted amount of light depending on at least an angle and a plurality first slits installed in parallel in a first direction to sense a light quantity of light transmitting between the first slits in the first area biased to one side and a light quantity in a second, area biased to the other side and a second photo diode that is adjacently installed to the first photo diode and uses second barrier ribs having a height to change the transmitted amount of light depending on at least the angle and a plurality of second slits installed in parallel in a second direction to sense a light quantity of light transmitting between the second slits in a third area biased to one side and a light quantity in a fourth area biased to the other side.

The first photo diode may include a first eccentric array that is installed under the first barrier ribs and is installed to be biased to one side with respect to central lines of each of the first slits and outputs signals having different intensities depending on the light quantity and a second eccentric array that is installed under the first barrier ribs and is installed to be biased to the other side with respect to the central lines of each of the first slits and outputs signals having different intensities depending on the light quantity.

The light emitting element may be an infrared LED having a light emitting axis passing through an intersecting point of the first light receiving axis and the second light receiving axis.

The multi-position sensing apparatus may further include: a body that has a horizontal part and a vertical part and is bent at an angle of 90° on the whole, in which the light emitting element may be installed at an inside inclined part inclined at an angle of 45° between the horizontal part and the vertical part of the body, the first light receiving part may be installed at the inside surface of the horizontal part of the body, and the second light receiving part may be installed at an inside surface of the vertical part of the body.

The multi-position sensing apparatus may further include: a third light receiving part having a third light receiving area in a third light receiving range angle with respect to a third light receiving axis intersected at a crossing angle to the first light receiving axis to receive the reflective light reflected from the first target.

The multi-position sensing apparatus may third light receiving area in a third light receiving range angle with respect a third light receiving axis intersected at a crossing angle to the first light receiving axis to receive the reflective light reflected from the first target and a fourth light receiving part that has a fourth light receiving area in a fourth light receiving range angle with respect a fourth light receiving axis intersected at a crossing angle to the first light receiving axis to receive the reflective light reflected from the first target.

ADVANTAGEOUS EFFECTS

According to some of the embodiments of the present invention configured as described above, it is possible to more accurately determine the height value of the target, and perform the multi-command inputs such as zoom in and zoom out by accurately determining the positions of each of the fingers even by the contactless scheme when the user carries out the multi operations such as splaying or puckering fingers. However, the scope of the present invention is not limited to the above-mentioned effect,

BEST MODE

Figure 1:
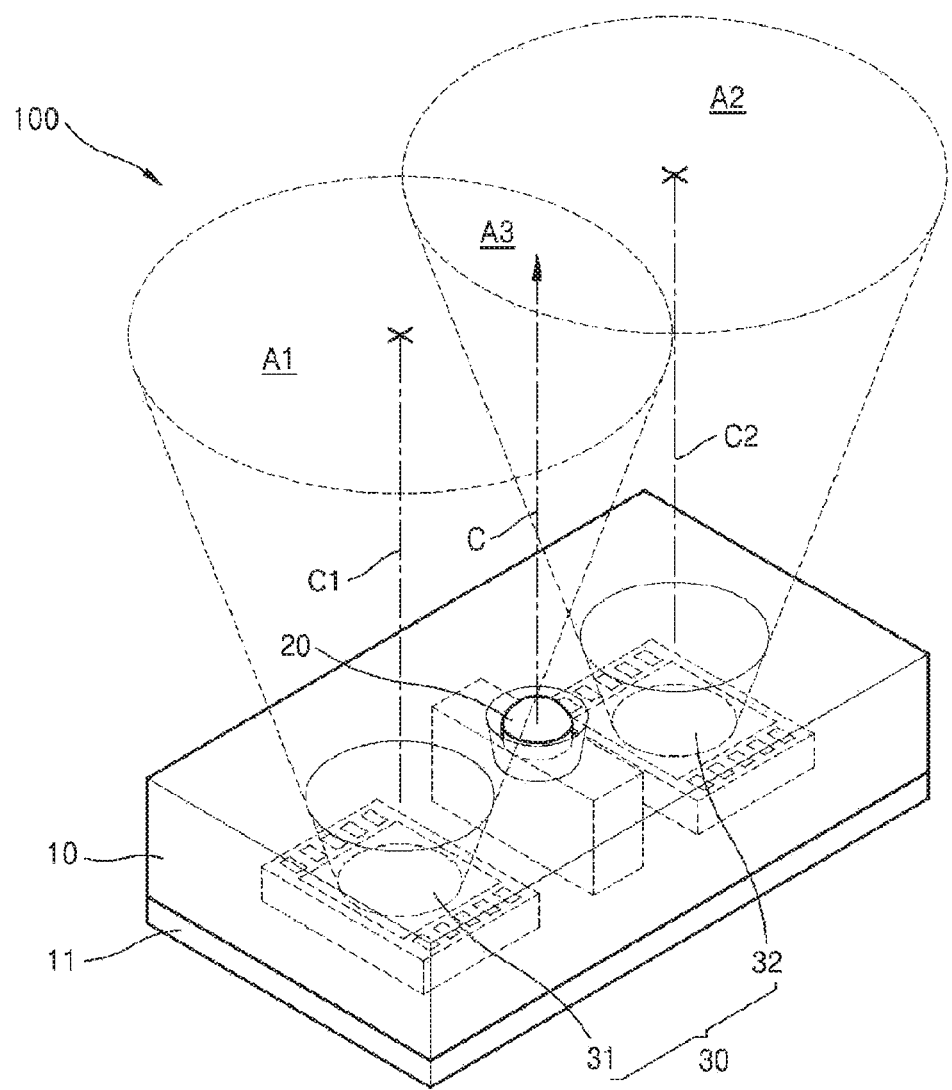
FIG. 1 is a perspective view illustrating a multi-position sensing apparatus according to some embodiments of the present invention.

Hereinafter, preferred embodiments of the present invention will be described in detail with reference to the accompanying drawings.

Examples of the present invention are provided in order to more completely explain the present invention to those skilled in the art. Examples below may be scope of the present invention. Rather, these exemplary embodiments are provided in order to make this disclosure more thorough and complete and completely transfer ideas of the present invention to those skilled in the art. Further, thicknesses or sizes of each layer are exaggerated in the drawings for convenience and clarity of description.

Throughout the specification, the description in which it is represented that one component such as, a film, an area, and a substrate is positioned to be "on" or "connected to", "stacked on", or "coupled to" other components may be understood that the one component directly contacts other components to be "on" or "connected to", "stacked on", or "coupled to" other components or other components may be present therebetween. On the other hand, it. is understood, that the description in which one component is positioned to be "directly on" or "directly connected to" or "directly coupled to" other components is that other components interposed therebetween are not present. Like reference numerals denote like elements. As used in the present specification, a term "and/or" includes any one or at least one combination of enumerated items.

In the present specification, although terms such as first, second, etc., are used to describe various members, components, areas, layers and/or portions thereof, these members, components, areas, layers and/or portions thereof are not limited to these terms. These terms are used only to distinguish one member, component, area, layer or a portion thereof from another member, component, area, layer or a portion thereof. Accordingly, a first member, a first component, a first area, a first layer, or a portion thereof to be described below may indicate a second member, a second component, a second area, a second layer, or a portion thereof within the scope of the present invention.

Further, relative terms such as "on" or "over" and "under" or "below" may be used herein to describe the relationship of any elements with respect to other elements as illustrated in the drawings. It may be understood that the relative terms include other directions of the elements in addition to the direction illustrated in the drawings. For example, if the element is turned over in the drawings, elements described as being present on surfaces of upper portions of other elements have a direction on surfaces of lower portions of the other components. Therefore, the term "on" as an example may include both of "under" and "on" directions, depending on the specific direction of the drawing. If an element is toward other directions (rotation by 90° with respect to other directions), the relative descriptions used in the present specification may be analyzed based thereon.

Terms used in the present specification are for explaining the specific embodiments rather than limiting the present invention. Unless explicitly described to the contrary, a singular form includes a plural form in the present specification. The word "comprise" and variations such as "comprises" or "comprising," will be understood to imply the inclusion of stated numbers, steps, operations, members, and/or elements but not the exclusion of any other numbers, steps, operations, members, and/or elements used in the present specification.

Hereinafter, the embodiments of the present invention will be described with reference to the drawings schematically illustrating the ideal embodiments. In the drawings, for example, the changes of the illustrated shape depending on manufacturing technologies and/or tolerance may be expected. Therefore, the embodiment of the present invention is not understood as being limited to the specific shape of the illustrated area. For example, the embodiment of the present invention needs to include the change in shape caused in manufacturing.

FIG. 1 is a perspective view illustrating a multi-position sensing apparatus 100 according to some embodiments of the present invention. Further, FIG. 2 is a cross-sectional view of the multi-position sensing apparatus 100 of FIG. 1 and FIG. 3 is a conceptual diagram of the multi-position sensing apparatus 100 of FIG. 1.

Figure 2:
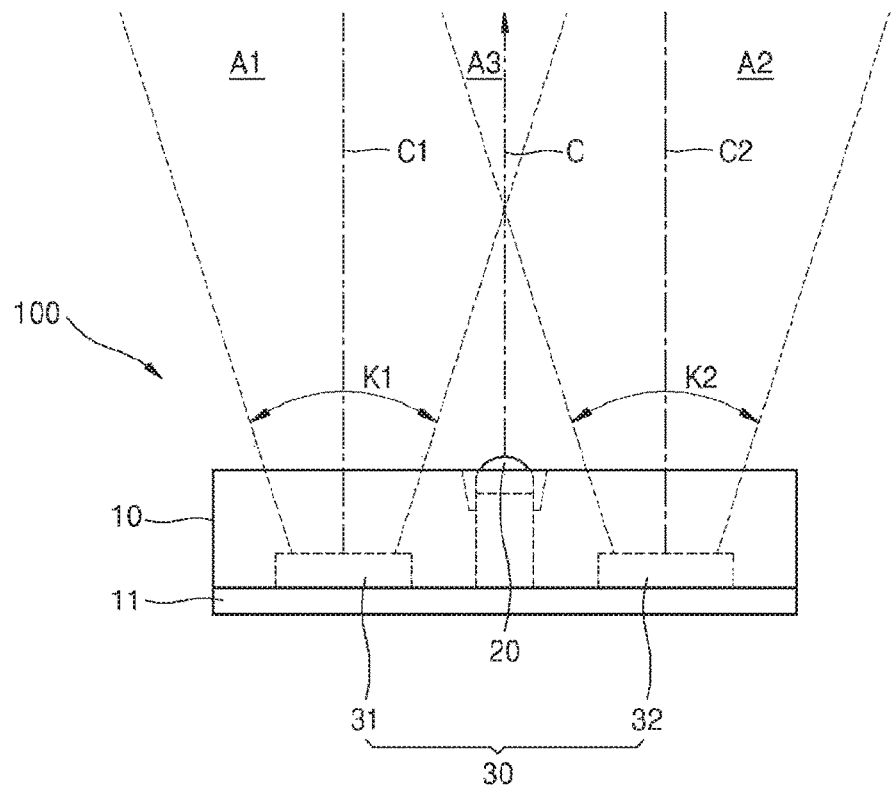
FIG. 2 is a cross-sectional view of the multi-position sensing apparatus of FIG. 1.
Figure 3:
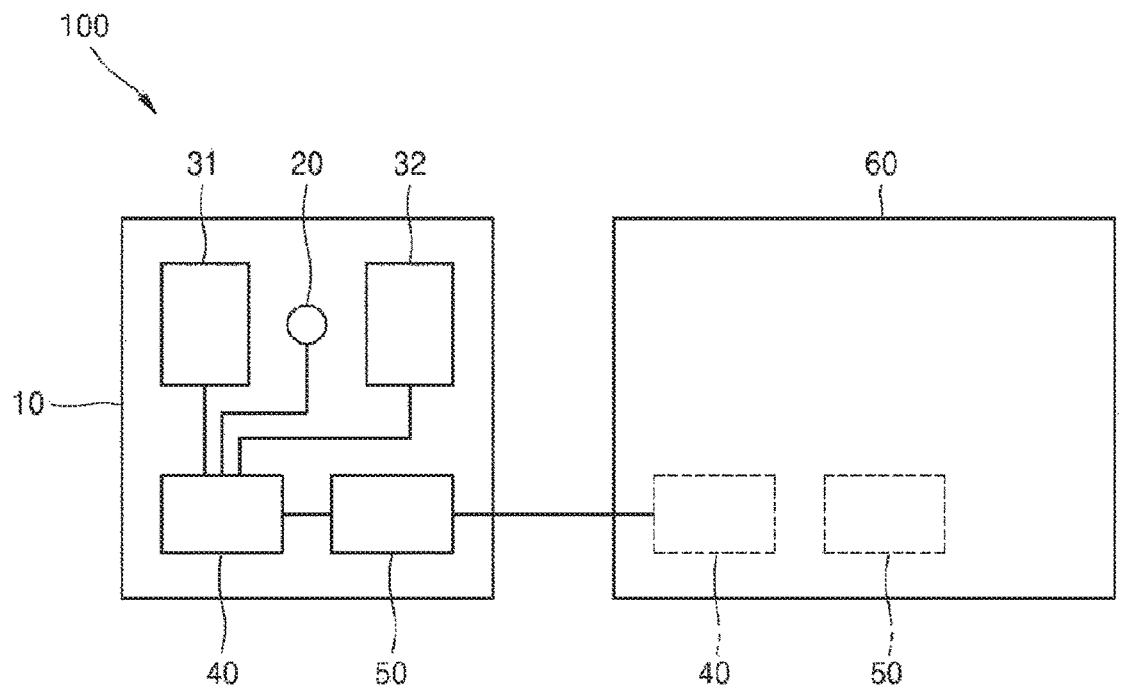
FIG. 3 is a conceptual diagram of the multi-position sensing apparatus of FIG. 1.

First, as illustrated in FIGS. 1 to 3, the multi-position sensing apparatus 100 according to some embodiments of the present invention may largely include a light emitting element 20 and a light receiving part 30.

For example, the light emitting element 20 and the light receiving part 30 may be installed in a body 10 or a substrate 11, The body 10 may be a structure having appropriate strength and durability to support the light emitting element 20 and the light receiving part 30. Further, it may also be understood that the light emitting element 20 and the light receiving part 30 may be seated on the substrate 11, The substrate 11 may be a structure that is lengthily formed in a lower portion of the body 10 in a longitudinal direction in a bar shape. In this case, the body 10 may not be one structure but may be a structure that is separated into several parts.

Although the present embodiment describes the body 10 and the substrate 11 separately, in a modified example of the present embodiment, any one of the body 10 and the substrate 11 may be omitted or a combination of the body 10 and the substrate 11 may also be called the body 10.

For example, as illustrated in FIGS. 1 and 2, the substrate 11 may be made of a material having appropriate mechanical strength and insulation or a conductive material to support the light emitting element 20 and the light receiving part 30. As a more detailed example, the substrate 11 may be a printed circuit board (PCB) in which an epoxy-based resin sheet is formed in a multi layer. Further, the substrate 11 may be a flexible printed circuit board (FPCB) of a flexible material.

In addition, as the substrate 11, a synthetic resin substrate made of resin, glass, epoxy, or the like may be applied or considering thermal conductivity, a ceramic substrate may be applied. Further, the substrate 11 may be partially or entirely made of at least any one selected from the group consisting of epoxy mold compound (EMC), polyimide (PI), ceramic, graphene, synthetic glass fiber, and at least any one of combinations thereof to improve workability.

In addition, the substrate 11 may include a lead frame having one side and the other side based on an electrode separating space, in which one side is formed with a first electrode and the other side is formed with a second electrode. For example, as the substrate 11, a substrate, or the like made of metals such as insulated aluminum, copper, zinc, tin, lead, gold, and silver may be applied and substrates having a plate shape or a lead frame shape may be applied.

Meanwhile, the light emitting element 20 is installed in the body 10 or the substrate 11 and may be a light emitting member that irradiates detection light DL to a first target 1 or a second target 2.

As a more detailed example, the light emitting element 20 is installed at a middle of an upper surface of the body 10 and may be an infrared light emitting diode (LED) having a light emitting axis C that is vertical upwardly of the body 10. However, the light emitting element 20 is not limited only to the infrared LED.

That is, as illustrated in FIGS. 1 to 3, the light emitting element 20 may be made of semiconductor. For example, blue, green, red, and yellow LEDs made of nitride semi conductor, ultraviolet or infrared LED, or the like may be applied. The nitride semi conductor may be $Al_xGa_yIn_zN$ having a general Formula ($0 \leq x \leq 1$, $0 \leq y \leq 1$, $0 \leq z \leq 1$, $x+y+z=1$).

Further, the light emitting element 20 may be formed, by epitaxially growing nitride semiconductors such as InN, AlN, InGaN, AlGaN, and InGaAlN on a sapphire substrate or a silicon carbide substrate for growth by, for example, chemical vapor deposition such as MOCVD. Further, the light emitting element 20 may be made of semiconductors such as ZnO, SnS, ZnSe, SiC, GaP, GaAlAs, and AlInGaP in addition to the nitride semiconductor. These semiconductors may use a laminate formed in order of an n-type semiconductor layer, a light emitting layer, and a p-type semiconductor layer. The light emitting layer (active layer) may use a stacked semiconductor having a multi quantum well structure or a single quantum well structure or a stacked semiconductor having a double hetero structure. Further, the light emitting element 20 may be selected as one having any waveform according to purposes such as display purpose and lighting purpose.

Here, as the substrate for growth, insulating, conductive, or semiconductor substrates may be used if necessary. For example, the substrate for growth may be made of sapphire, SiC, Si, $MgAl_2O_4$, MgO, $LiAlO_2$, $LiGaO_2$, and GaN, For the epitaxial growth of the GaN material, it is preferable to use the GaN substrate that is a homogenous substrate. However, the GaN substrate has a trouble in manufacturing and therefore has high production costs.

As a heterogeneous substrate, the sapphire substrate, the silicon carbide (SiC) substrate, or the like has been mainly used. Among those, the sapphire substrate has been more frequently used than the expensive silicon carbide substrate. Upon the use of the heterogeneous substrate, defects such as dislocation are increased due to a difference in lattice constant between a substrate material and a thin film material. Further, a warpage occurs upon a change in temperature due to a difference in a coefficient in thermal expansion between the substrate material and the thin film material, which becomes a cause of cracks of the thin film. It is possible to reduce the above problem using a buffer layer between the substrate and the GaN-based light emitting laminate.

Further, the substrate for growth may be entirely or partially removed or patterned during the manufacturing process of the chip to improve optical or electrical characteristics of an LED chip before or after the growth of the LED structure.

For example, in the case of the sapphire substrate, a laser may be irradiated to an interface with the semiconductor layer through the substrate to separate the substrate and the silicon substrate or the silicon carbide substrate may be removed by methods such as polishing/etching.

Further, when another support substrate may be used to remove the substrate for growth, the support substrate is bonded to an opposite side of the original substrate for growth using reflective metal to improve the optical efficiency of the LED chip or a reflective structure may be inserted into a middle of a bonding layer, Further, the patterning of the substrate for growth may form ruggedness or an inclined surface on a main surface (surface or both side surfaces) or side surfaces of the substrate before or after the LED structure grows, thereby improving light extraction efficiency. A size of the pattern may be selected within a range from 5 nm to 500 μm, and the pattern may be a regular or irregular structure as long as it may make the light extraction efficiency good. The pattern may also have various shapes such as a pillar, a mountain, a hemisphere, and a polygon.

The sapphire substrate is a crystal having hexa-rhombo (R3c) symmetry and has lattice constants in c-axis and a-axis directions each of which is 13.001 and 4.758, respectively, and has a C plane, an A plane, an R nitride thin film relatively easily grown thereon and is stable at high temperature, and therefore is mainly used as the substrate for nitride growth.

Further, as another material of the substrate for growth, an Si substrate may be used. The Si substrate may be more appropriate for a large diameter and relatively cheaper, such that mass production of the Si substrate may Further, the silicon (Si) substrate absorbs light generated from the GaN-based semiconductor to reduce external quantum, efficiency of the light emitting element. Therefore, if necessary, the silicon (Si) substrate is removed and the support substrate such as a metal substrate, or a substrate including a reflecting layer and any one of Si, Ge, SiAl, and ceramic is additionally formed.

When the GaN thin film grows on the heterogeneous substrate like the Si substrate, a dislocation density may be increased due to a mismatch of the lattice constant between the substrate material and the thin film material and the cracks and the warpage may occur due to the difference in the coefficient of thermal expansion. To prevent the dislocation and the crack of the light emitting laminate, a buffer layer may be disposed between the substrate for growth and the light emitting laminate. The buffer layer serves to adjust the warpage degree of the substrate upon the growth of the active layer to reduce a wavelength dispersion of a wafer.

Here, the buffer layer may use $Al_xIn_yGa_{1-x-y}N$ ($0 \le x \le 1$, $0 \le y \le 1$, $x+y \le 1$), in particular, may use GaN, AlN, AlGaN, InGaN, or InGaNAlN, if necessary, may use materials such as $ZrB_2$, $HfB_2$, ZrN, HfN, and TiN. Further, a plurality of layers that are combined or a composition that is gradually changed may also be used.

Further, although not illustrated, the light emitting element 20 may have a flip chip form having signal transfer media such as a bump, a pad, and a solder. In addition to this, all light emitting elements in which a bonding wire is applied to both of a first terminal and a second terminal such as a horizontal type and a vertical type or the bonding wire is partially applied only to the first terminal or the second terminal may be applied.

Further, one light emitting element 20 may be installed in the body 10 or the substrate 11 as well as a plurality of light emitting elements 20 may be installed in the body 10 or the substrate 11.

Further, the light emitting element 20 may be applied, to all kinds of light emitting apparatuses such as various kinds of lamps of an infrared lamp, an ultraviolet lamp, or the like, a fluorescent lamp, and a bulb.

Meanwhile, as illustrated in FIG. 1, a plurality of light receiving parts 30 are disposed in the body 10 or the substrate 11 while forming an array, in which the light receiving part 30 may include a first light receiving part 31 and a second light receiving part 32.

As a more detailed example, as illustrated in FIGS. 1 to 3, the first light receiving part 31 is installed in the body 10 and may be a light receiving member having a first light receiving area A1 in a first light receiving range angle K1 with respect to a first light receiving axis C1 to receive first reflective light L1 or second reflective light L2 reflected from the first target 1 or the second target 2.

Further, the second light receiving part 32 is installed in the body 10 and may be a light receiving member having a second, light receiving area A2 in a second light receiving range angle K2 with respect to a second light receiving axis C2 in parallel to the first light receiving axis C1 to receive the second reflective light L2 or the first reflective light L1 reflected from the second target 2 or the first target 1.

Further, as illustrated in FIGS. 1 and 2, a portion of the first light receiving area A1 of the first light receiving part 31 and a portion of the second light receiving area A2 of the second light receiving part 32 may be an area A3 overlapping with each other.

Here, the light emitting element 20 may be an infrared LED having the light emitting axis C in parallel to the first light receiving axis C1.

Further, as illustrated in FIGS. 1 and 2, the light emitting element 20 is installed at the middle of the upper surface of the body 10 to uniformly irradiate the detection light DL to the first light receiving area A1 of the first light receiving part 31 and the second, light receiving area A2 of the second light receiving part 32, the first light receiving part 31 is installed at one end portion of the upper surface of the body 10 to easily calculate a trigonometric function, and the second light receiving part 32 may be installed at the other end portion of the upper surface of the body 10 in symmetry with the first light receiving part 31.

However, the positions of the light emitting element 20, the first light receiving part 31, and the second light receiving part 32 are not limited thereto. For example, the first light receiving part 31 and the second light receiving part 32 may be eccentrically installed at one side of the light emitting element 20 or the light emitting element 20, the first light receiving part 31, and the second light receiving part 32 may also be triangularly disposed to form a triangle with respect to one another.

The installation positions or the forms of the light emitting element 20, the first light receiving part 31, and the second light receiving part 32 may be very diverse depending on the shape of the body 10, the sensing place, the sensing environment, the form of the target, or the like.

Meanwhile, as illustrated in FIG. 3, the multi-position sensing apparatus 100 according to some embodiments of the present invention may further include a height calculator 40 and a multi-position recognizer 50.

As a more detailed example, the height calculator 40 may be a micro processor, a circuit, or a program which receives position and angle signals of the first target 1 from the first light receiving part 31 to more accurately measure the height of the target, to thereby output positional information of the first target 1, receives position and angle signals of the second target 2 from the second light receiving part 32 to output positional information of the second target 2, and uses a trigonometric function to calculate the height values of the first target 1 and the second target 2 when the positional information of the first target 1 and the positional information of the second target 2 approach a reference range.

Here, after a coordinate system having X and Y axes are drawn on a plane based on an original point O, the trigonometric function and then represents function values of a sine, a cosine, a tangent, a secant, a cosecant, and a cotangent depending on an event connecting between points having coordinates of the coordinate system and the original point and an angle thereof. For example, when a distance between the first light receiving part 31 and the second light receiving part 32 is known and the angle of the target is known, the height of the target may be accurately calculated by using the function values.

Therefore, since the intensity of the reflective light reflected from the surface of the target may be changed depending on the state of the surface thereof, the related art uses only the intensity of the reflective light reflected from the target to inaccurately estimate the height of the target at a guess. However, by the multi-position sensing apparatus 100 of the present invention, it is possible to very accurately calculate the height of the target based on the trigonometric function, Further, the multi-position recognizer 50 may be a micro processor, a circuit, or a program which receives the position and angle signals of the first target 1 from the first light receiving part 31 to output the positional information of the first target 1, receives the position and angle signals of the second target 2 from the second, light receiving part 32 to output the positional information of the second target 2, and outputs multi-position values for recognizing the first target 1 and the second target 2 as being separated from each other when the positional information of the first target 1 and the positional information of the second target 2 are out of the reference range.

For example, the case in which the positional information of the first target 1 and the positional information of the second target 2 are out of the reference range may be a case in which an angle line of the first target 1 measured by the first light receiving part 31 and an angle line of the second target 2 measured by the second light receiving part 32 do not intersect each other.

Here, as illustrated in FIG. 3, the height calculator 40 and the multi-position recognizer 50 may be installed, in the body 10. In addition to this, the height calculator 40 and the multi-positron recognizer 50 may also be included in all kinds of information terminals 60, which may be connected to the multi-position sensing apparatus 100 of the present invention, in the form of the micro processor, the circuit, or the program.

In addition to this, the height calculator 40 and the multi-position recognizer 50 are a kind of control device that may output the position signal depending on the sensing area of the target in response to the signal sensed by the light receiving part 30 and may be implemented in a form of various kinds of electronic parts such as a micro processor, a semiconductor device, a computer, an operator, a calculator, a machine control unit or a micro controller unit (MCU), and a central processing unit (CPU).

Figure 4:
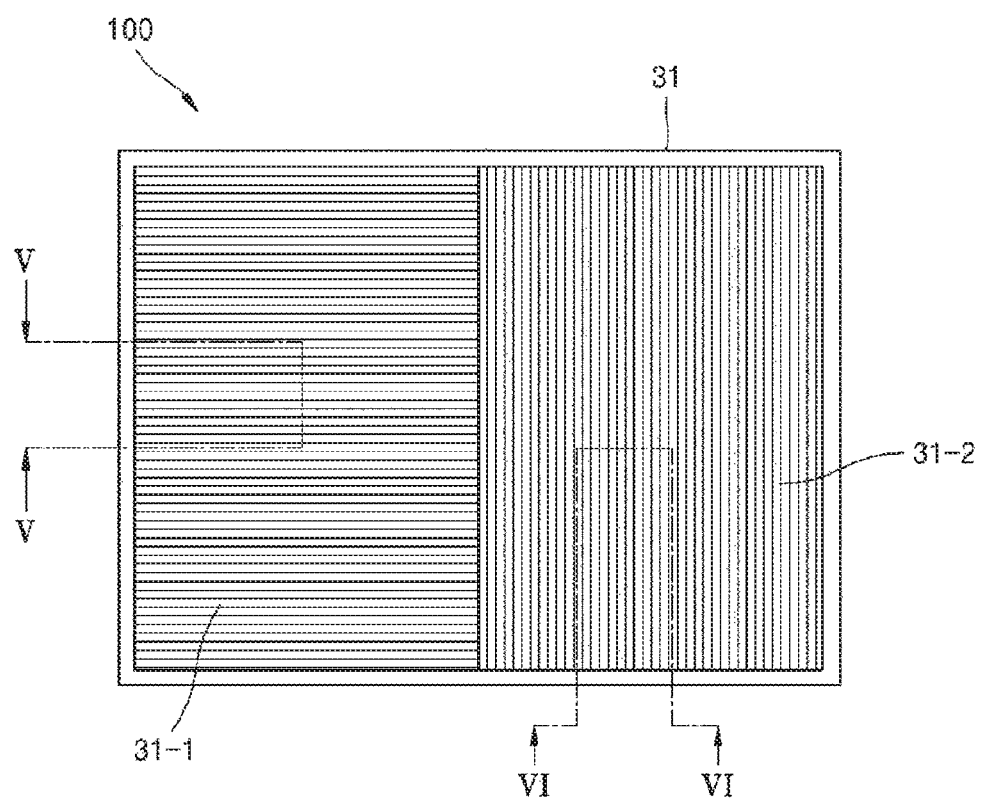
FIG. 4 is a plan view illustrating a first light receiving part of the multi-position sensing apparatus of FIG. 1.
Figure 5:
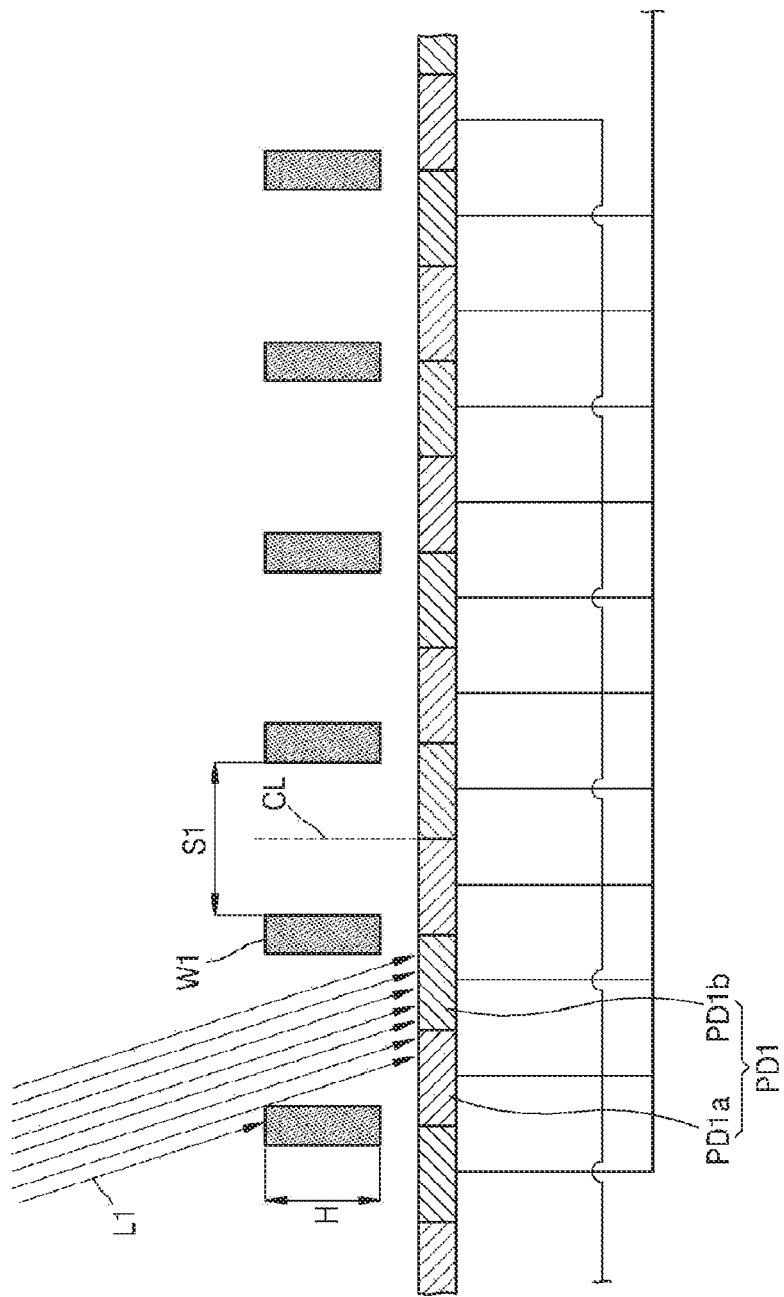
FIG. 5 is a cross-sectional view conceptually illustrating a V-V cutting plane of the first light receiving part of FIG. 4.
Figure 6:
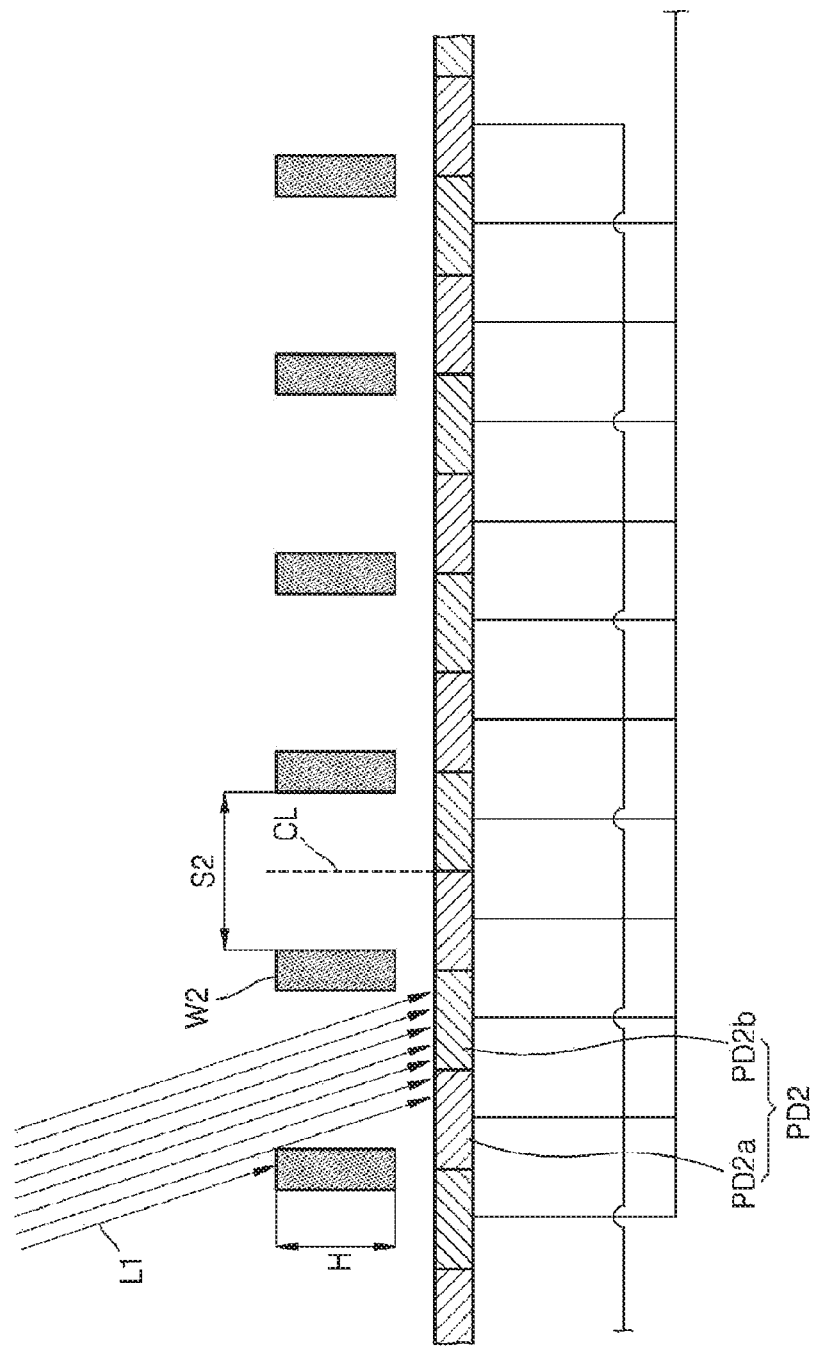
FIG. 6 is a cross-sectional view conceptually illustrating a VI-VI cutting plane of the first light receiving part of FIG. 4.

FIG. 4 is a plan view illustrating the first light receiving part 31 of the multi-position sensing apparatus 100 of FIG. 1. FIG. 5 is a cross-sectional view conceptually illustrating a V-V cutting plane of the first light receiving part 31 of FIG. 4 and FIG. 6 is a cross-sectional view conceptually illustrating a VI-VI cutting plane of the first light receiving part 31 of FIG. 4.

As illustrated in FIG. 4, the first light receiving part 31 of the multi-position sensing apparatus 100 according to some embodiments of the present invention is a light receiving device that may receive the reflective light L1 reflected from the target by the detection light and may be, for example, a photo diode.

The photo diode is a kind of photo sensor that may convert optical energy into electrical energy to obtain an electrical signal (current or voltage) from an optical signal and may be a semiconductor device that is formed by giving an optical detection function to a junction portion of the diode.

Here, the photo diode may basically use a principle of generating excess electrons or holes due to absorption of photons to modulate conductivity of the diode in response to the optical signal. That is, the current of the photo diode is substantially changed depending: on an optical generation rate of carrier, which may provide a useful apparatus that converts the optical signal changed As illustrated in FIG. 4, the first light receiving part 31 using the photo diode may largely include an X-axis sensing sensor 31-1 that may sense an angle in an X-axis direction of the target and a Y-axis sensing sensor 31-2 that may sense an angle in a Y-axis direction of a target M.

As a more detailed example, the X-axis sensing sensor 31-1 may include a first photo diode PD1 and the Y-axis sensing sensor 31-2 may include a second photo diode PD2.

Here, as illustrated in FIG. 5, the first photo diode PD1 may be a photo diode that may use first barrier ribs W1 having a height H to change a transmitted amount of light depending on at least an angle and a plurality of first slits S1 installed in parallel in a first direction to sense a light quantity in the first area biased to one side of light transmitting between the first slits S1 and a light quantity in a second area biased to the other side.

Further, as illustrated in FIG. 5, the first photo diode PD1 may include a first eccentric array PD1$a$ and a second eccentric array PD1$b$.

The first eccentric array PD1$a$ is installed under the first barrier ribs W1 and is installed to be biased to one side with respect to central lines CL of each of the first slits S1 and may output signals having different intensities depending on the light quantity.

Further, the second eccentric array PD1b is installed, under the first barrier ribs W1 and is installed to be biased to the other side with respect to the central lines CL of each of the first, slits S1 and may output signals having different intensities depending on the light quantity.

Therefore, as illustrated in FIG. 5, when the reflective light L1 reflected from the target passes through the plurality of first slits S1 while having an angle biased to one side, the relatively larger amount of light may reach the second eccentric array PD1b installed at the other side than the first eccentric array PD1a installed at one side due to the first barrier ribs W1.

That is, as the angle biased to one side of the reflective light L1 reflected from the target is getting larger and larger, the relatively larger amount of light may be output to the second eccentric array PD1b than the first eccentric array PD1a.

Therefore, a discriminator may use a difference in the outputs of the relative electrical signals of the first eccentric array PD1a and the second eccentric array PD1b to determine an X-axis angle of the target.

Meanwhile, as illustrated in FIG. 6, the second photo diode PD2 may be a photo diode that may use second, barrier ribs W1 having a height H to change a transmitted amount of light depending on at least an angle and a plurality of second slits S2 installed in parallel in a second direction to sense a light quantity of light transmitting between the second slits S2 in the first area biased to one side and a light quantity in a second area biased to the other side.

Further, as illustrated in FIG. 4, the second photo diode PD2 may include a first eccentric array PD2a and a second eccentric array PD2b.

The first eccentric array PD2a is installed under the second barrier ribs W2 and is installed to be biased to one side with respect to central lines CL of each of the second slits S2 and may output signals having different intensities depending on the light quantity.

Further, the second eccentric array PD2b is installed, under the second barrier ribs W2 and is installed to be biased to the other side with respect to the central lines CL of each of the second slits S2 and may output signals having different intensities depending on the light quantity.

Therefore, as illustrated in FIG. 4, when the reflective light L1 reflected from the target passes through the plurality of second slits S2 while having an angle biased to one side, the relatively larger amount of light may reach the second eccentric array PD2b installed at the other side than the first eccentric array PD2a installed at one side due to the second barrier ribs W2.

That is, as the angle biased to one side of the reflective light L1 reflected from the target is getting larger and larger, the relatively larger amount of light may be output to the second eccentric array PD2b than the first eccentric array PD2a.

Therefore, the discriminator below may use a difference in the outputs of the relative electrical signals of the first eccentric array PD2a and the second eccentric array PD2b to determine a Y-axis angle of the target M.

The so determined X-axis angle and Y-axis angle of the target may be aggregated to finally calculate the angle of the target.

FIGS. 7 to 12 are cross-sectional views illustrating an operation process of the multi-position sensing apparatus 100 of FIG. 1.

Figure 7:
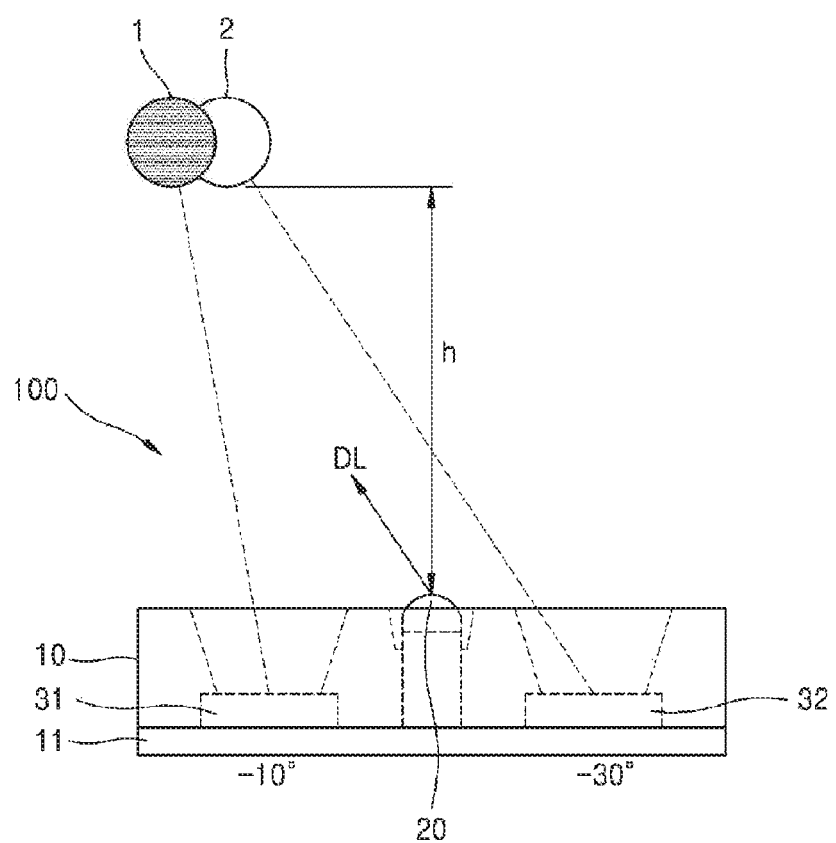
FIGS. 7 to 12 are cross-sectional views illustrating an operation process of the multi-position sensing apparatus of FIG. 1.

As illustrated in FIGS. 7 to 12, the operation process of the multi-position sensing apparatus 100 of FIG. 1 according to some embodiments of the present invention will be described as an example. First, as illustrated in FIG. 7, when the angle line (−10° with respect to a vertical line) of tine first target 1 measured by the first light receiving part 31 and the angle line (−30° with respect to a vertical line) of the second target 2 measured by the second light receiving part 32 may intersect each other, it may be determined that the positional information of the first target 1 and the positional information of the second target 2 approach the reference range by the height calculator 40 and the accurate height value of the first target 1 and the second target 2 may be calculated by the trigonometric function.

Figure 8:
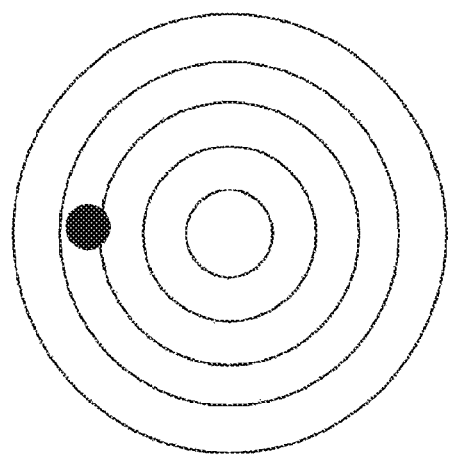

In this case, as illustrated in FIG. 8, the targets 1 and 2 may be recognized as one point biased to the left within the virtual measuring range represented, by a concentric circle.

Figure 9:
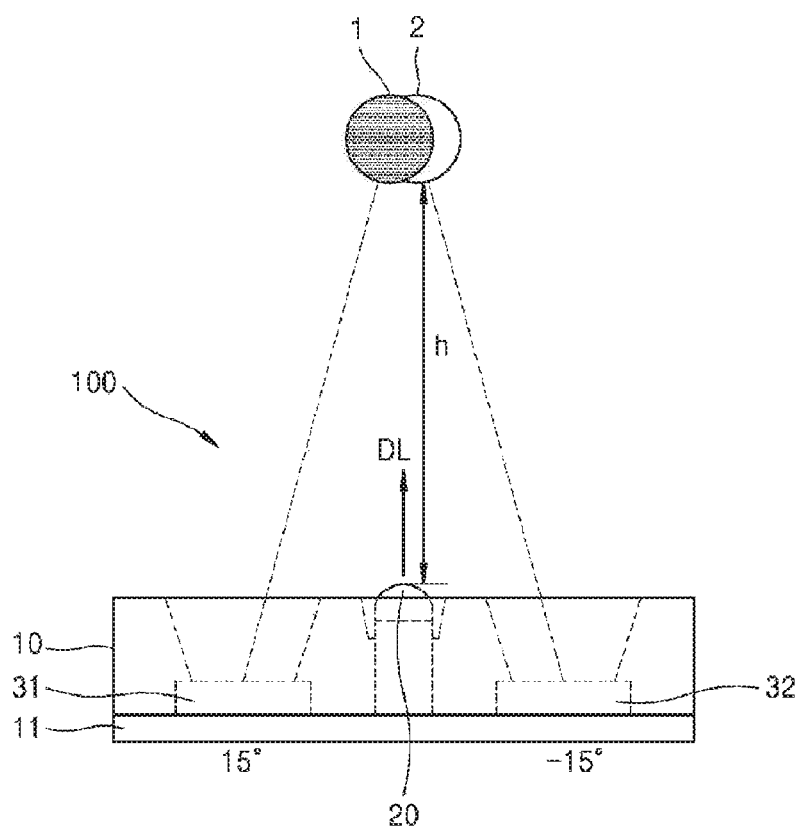

Meanwhile, as illustrated in FIG. 9, when the angle line (−15° with respect to a vertical line) of the first target 1 measured by the first light receiving part 31 and the angle line (−15° with respect to a vertical line) of the second target 2 measured by the second light receiving part 32 may intersect each other, it may be determined that the positional information of the first target 1 and the positional information of the second, target 2 approach the reference range by the height calculator 40 and the accurate height value of the first target 1 and the second target 2 may be calculated by the trigonometric function.

Figure 10:
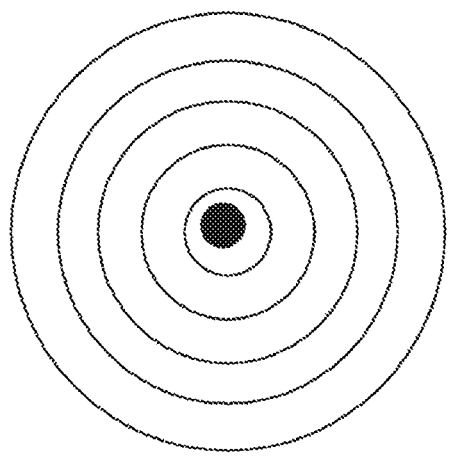

In this case, as illustrated in FIG. 10, the targets 1 and 2 may be recognized, as one point positioned at the center within the virtual measuring range represented by the concentric circle.

Figure 11:
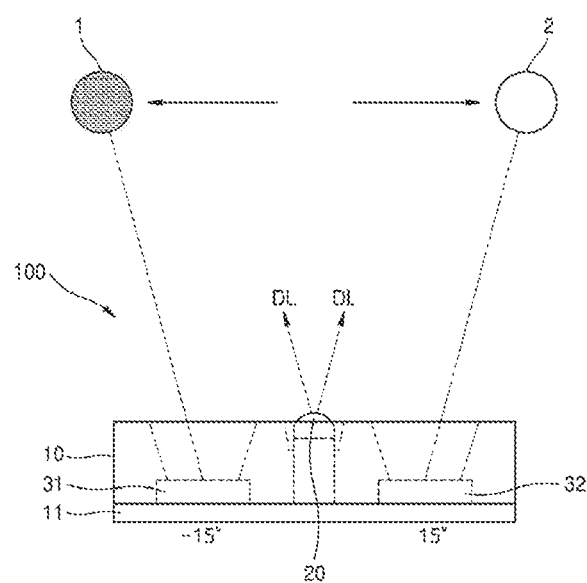

Meanwhile, as illustrated in FIG. 11, when the angle line (−15° with respect to a vertical line) of the first target 1 measured by the first light receiving part 31 and the angle line (−15° with respect to a vertical line) of the second target 2 measured by the second light receiving part 32 may not intersect each other, it may be determined that, the positional information of the first target 1 and the positional information of the second target 2 are out of the reference range by the multi-position recognizer 50 and the multi-position values for recognizing the first target 1 and the second target 2 as being separated from each other may be output.

Figure 12:
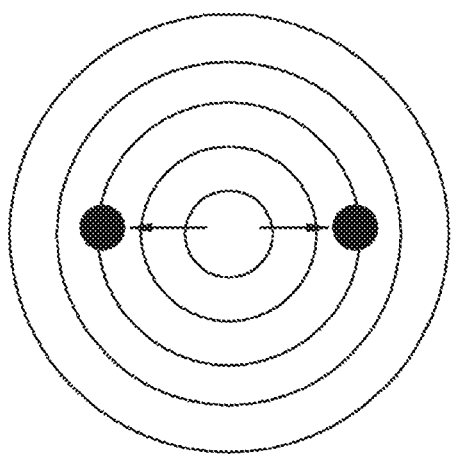

In this case, as illustrated in FIG. 12, the targets 1 and 2 may be multi-recognized as two points separated from the center to the left and the right within the virtual measuring range represented by the concentric circle.

Therefore, when the user carries out the multi operations such as splaying or puckering fingers, the positions of each of the fingers are accurately determined as a plurality of points and thus the multi command input such as zoom in, zoom out, or the like may be implemented.

Figure 13:
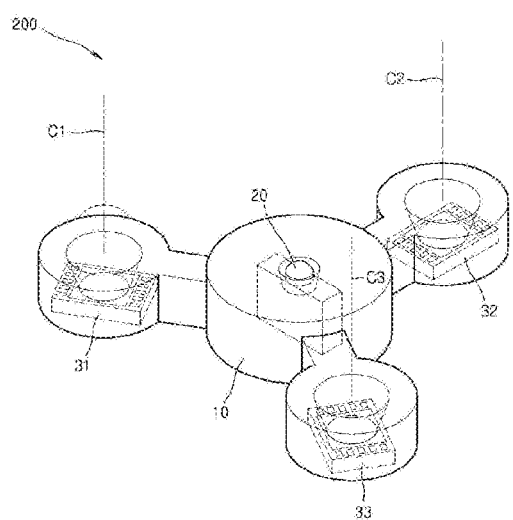
FIG. 13 is a perspective view illustrating a multi-position sensing apparatus according to some other embodiments of the present invention.

FIG. 13 is a perspective view illustrating a multi-position sensing apparatus 200 according to some other embodiments of the present invention, As illustrated in FIG. 13, the multi-position sensing apparatus 200 according to some other embodiments of the present invention may further include a third. light receiving part 33 that is installed in the body 10 and has a third light receiving area in a third light receiving range angle with respect to a third light receiving axis C3 in parallel to the first light receiving axis C1 to receive the first reflective light L1 or the second reflective light L2 reflected from the first target 1 or the second target 2, in addition to the first light receiving part 31 and the second light receiving part 32.

Here, to facilitate the calculation of the trigonometric function or the multi recognition, the first light receiving part 31, the second light receiving part 32, and the third light receiving part 33 may each be disposed at an equal angle of 120° with respect to the light emitting element 20.

Therefore, the multi position sensing apparatus 200 according to some other embodiments of the present invention may use a total of 3 light receiving parts such as the first light receiving part 31, the second light receiving part 32, and the third light receiving part 33 to perform the multi position recognition at all the angles of a front and back direction as well as a left and right direction. The installation number of light receiving parts is not limited to two or three as described above.

Figure 14:
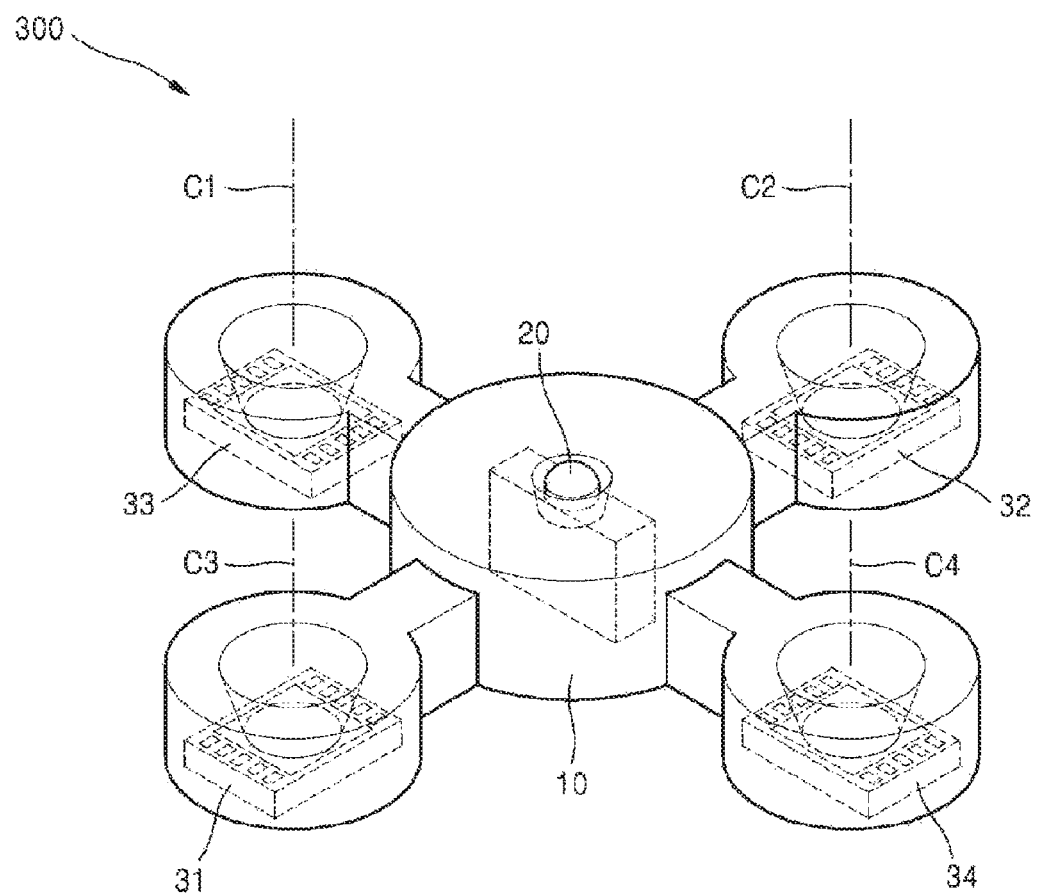
FIG. 14 is a perspective view illustrating a multi-position sensing apparatus according to some other embodiments of the present invention.

FIG. 14 is a perspective view illustrating a multi-position sensing apparatus 300 according to some other embodiments of the present invention.

As illustrated in FIG. 14, the multi position sensing apparatus 300 according to some embodiments of the present invention may further include the third light receiving part 33 that is installed in the body 10 and has the third light receiving area in the third light receiving range angle with respect to a third light receiving axis C3 in parallel to the first light receiving axis C1 to receive the first reflective light L1 or the second reflective light L2 reflected from the first target 1 or the second target 2 and a fourth light receiving part 34 that is installed in the body 10 and has a fourth light receiving area in a fourth light receiving range angle with respect to a fourth light receiving axis C4 in parallel to the first light receiving axis C1 to receive the first reflective light L1 or the second reflective light L2 reflected from the first target 1 or the second target 2, in addition to the first light receiving part 31 and the second light receiving part 32.

Here, to facilitate the calculation of the trigonometric function or the multi recognition, the first light receiving part 31, the second light receiving part 32, the third light receiving part 33, and the fourth light receiving part 34 may each be disposed at an equal angle of 90° with respect to the light emitting element 20.

Therefore, the multi position sensing apparatus 300 according to some other embodiments of the present invention may use a total of 4 light receiving parts such as the first light receiving part 31, the second light receiving part 32, the third light receiving part 33, and the fourth light receiving part 34 to more accurately perform the multi position recognition at all the angles of a front and back direction as well as a left and right direction. In addition to this, the installation number, installation position, the disposition form, or the like of light receiving parts may be designed to be optimized depending on the form or the kind of targets, the form or the environment of the sensing area, or the like.

Figure 15:
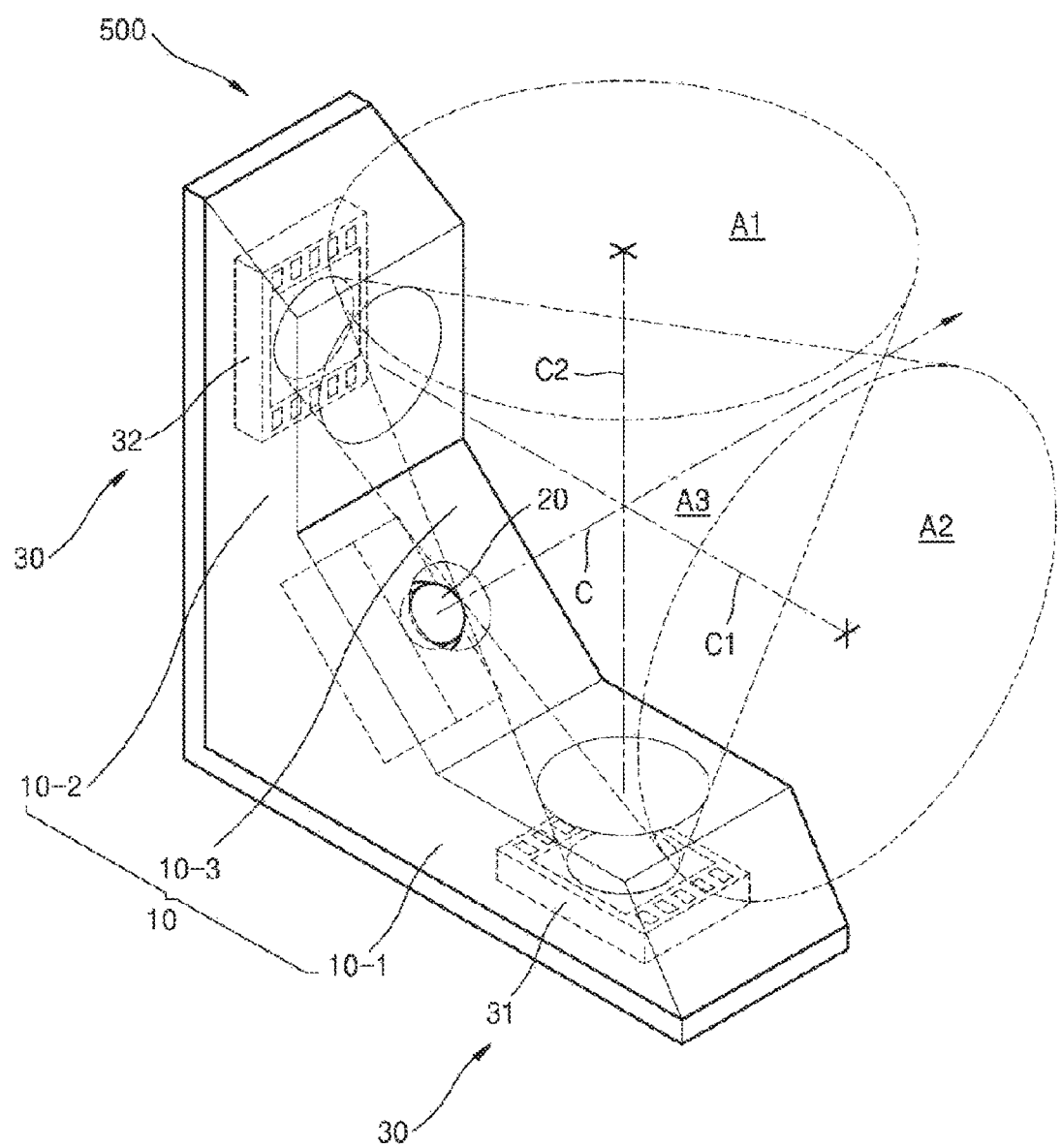
FIG. 15 is a perspective view illustrating a multi-position sensing apparatus according to some other embodiments of the present invention.
Figure 16:
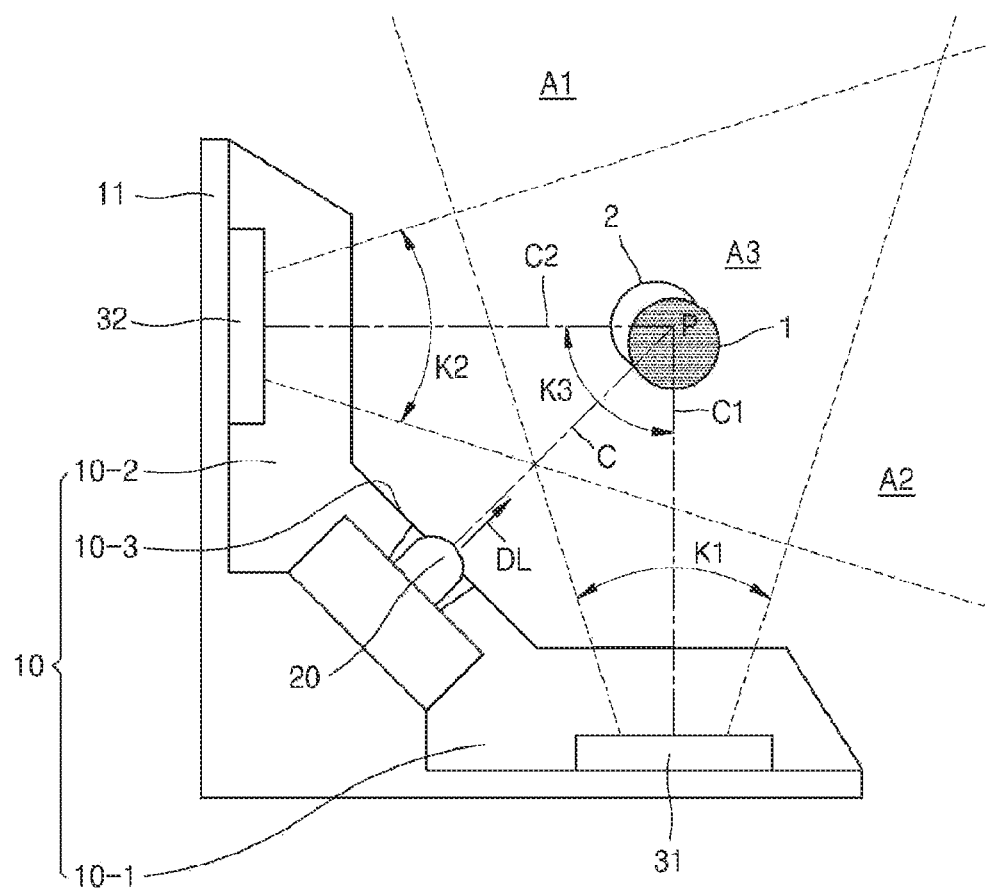
FIG. 16 is a cross-sectional view of the multi-position sensing apparatus of FIG. 15.
Figure 17:
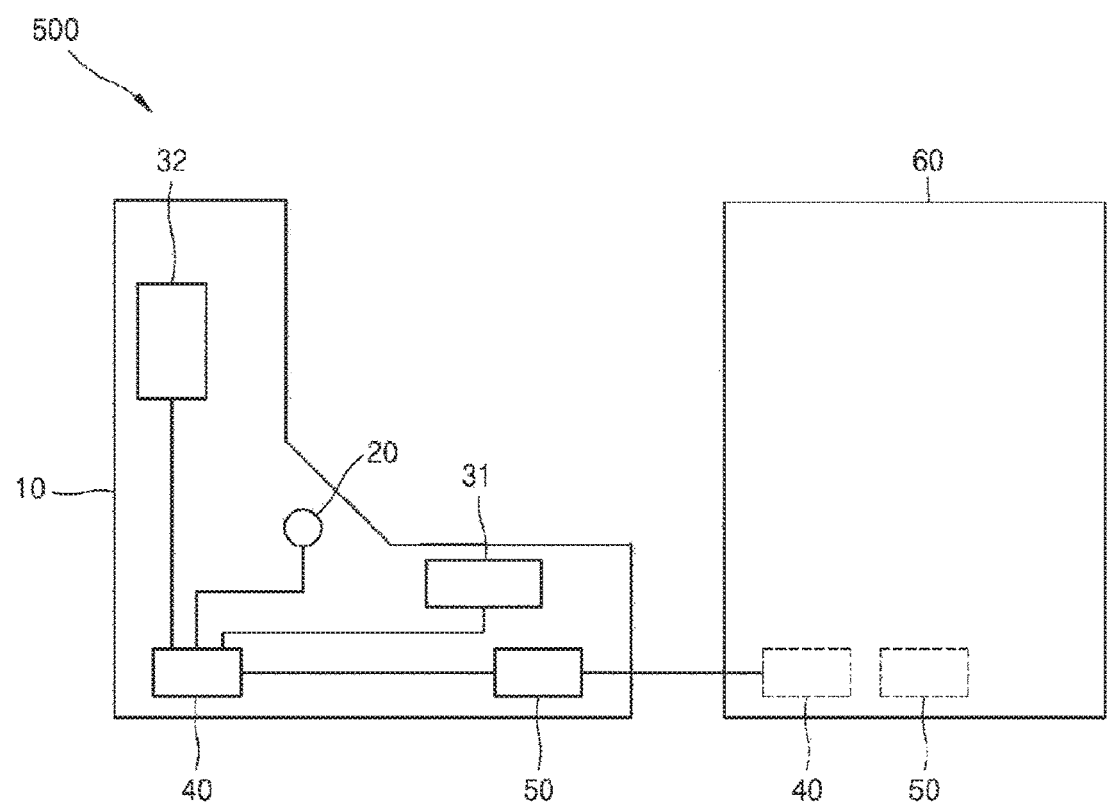
FIG. 17 is a conceptual diagram of the multi-position sensing apparatus of FIG. 15.

FIG. 15 is a perspective view illustrating a multi-position sensing apparatus 500 according to some other embodiments of the present invention. Further, FIG. 16 is a cross-sectional view of the multi-position sensing apparatus 500 of FIG. 15 and FIG. 17 is a conceptual diagram of the multi-position sensing apparatus 500 of FIG. 15.

In the embodiment, the body 10 includes a horizontal part 10-1 and a vertical part 10-2 and may have a shape bent at an angle of 90° on the whole.

Further, the substrate 11 may also have a shape bent at 90° along the body 10. For example, as illustrated in FIGS. 15 and 16, the substrate 11 may be made of a material having appropriate mechanical strength or insulation or a conductive material to support the light emitting element 20 and the light receiving part 30.

Meanwhile, the light emitting element 20 is installed in an inside inclined part 10-3 inclined at 45° between the horizontal part 10-1 and the vertical part 10-2 of the body 10 and may be a light emitting member that irradiates the detection light DL to the first target 1 or the second target 2.

As a more detailed example, the light emitting element 20 is installed at the bent portion of the middle of the body 10 and may be an infrared light emitting diode (LED) having the light emitting axis C that is inclined at 45°. However, the light emitting element 20 is not limited only to the infrared LED.

Meanwhile, as illustrated in FIG. 15, the plurality of light receiving parts 30 are disposed in the body 10 or the substrate 11 while forming an array, in which the light receiving part 30 may include a first light receiving part 31 and a second light receiving part 32.

Figure 18:
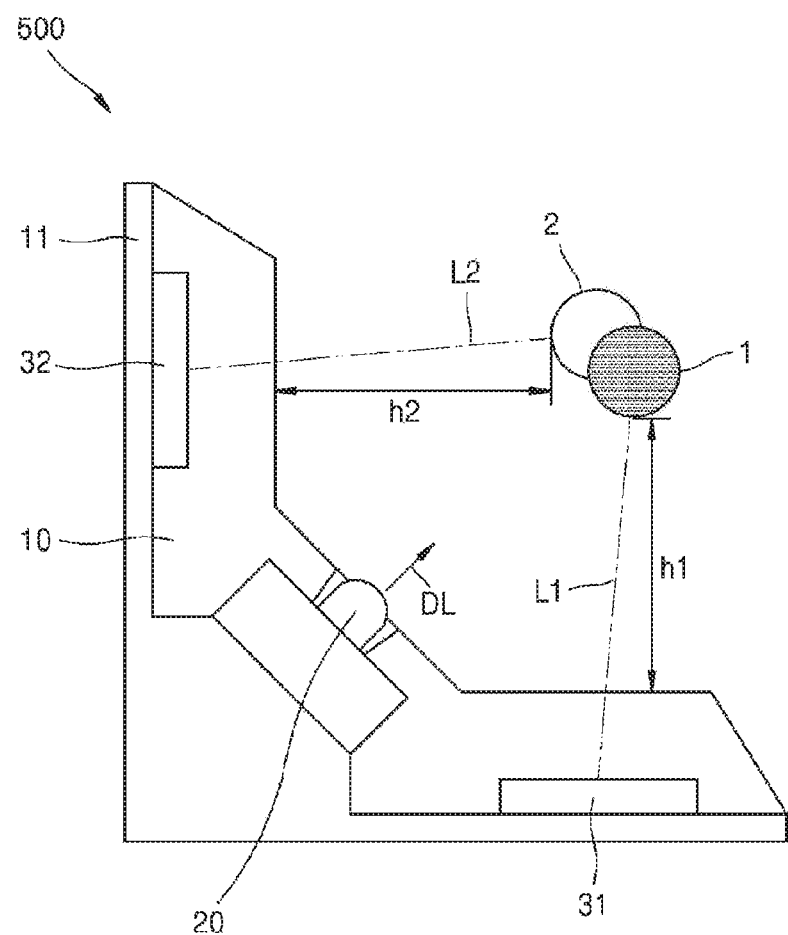
FIGS. 18 and 19 are cross-sectional views illustrating an operation process of the multi-position sensing apparatus of FIG. 15.
Figure 19:
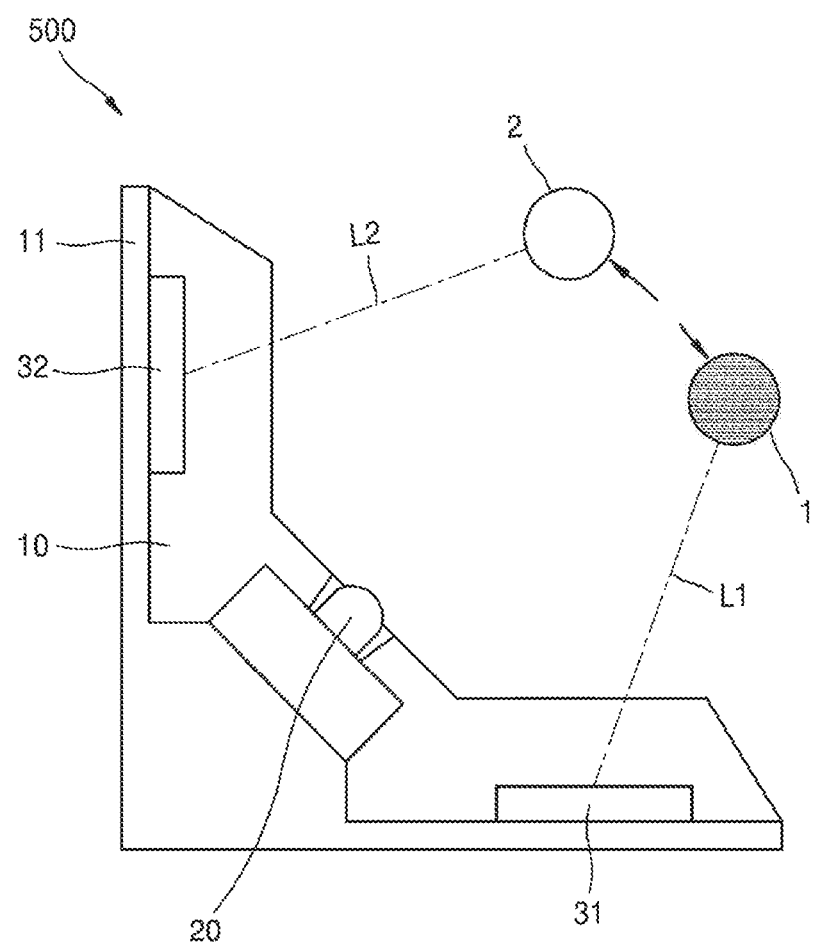

As a more detailed example, as illustrated in FIGS. 15 to 17, the first light receiving part 31 is installed, in the inside surface of the horizontal part 10-1 of the body 10 and may be a light receiving member having the first light receiving area A1 in the first light receiving range angle K1 with respect, to the first light receiving axis C1 to receive the first, reflective light L1 or the second reflective light 12 of FIGS. 18 and 19 reflected from the first target 1 or the second target 2.

Further, as illustrated in FIG. 16, the second light receiving part 32 is installed in the inside surface of the vertical part 10-2 of the body 10 and may be the light receiving member having the second light receiving area A2 in the second light receiving range angle K2 with respect to a second light receiving axis C2 intersected at a crossing angle K3 of 90° with respect to the first light receiving axis C1 to receive the second reflective light L2 or the first reflective light L1 reflected from the second target 2 or the first target 1.

Further, as illustrated in FIGS. 15 and 16, a portion of the first light receiving area A1 of the first light receiving part 31 and a portion of the second light receiving area A2 of the second light receiving part 32 may be the area A3 overlapping with each other.

Here, the light, emitting element 20 may be the infrared LED having the light emitting axis C passing through an intersecting point P of the first light receiving axis C1 and the second light receiving axis C2.

Further, as illustrated in FIGS. 15 and 16, the light emitting element 20 is installed at the bent middle portion of the body 10 at an angle of 45° to uniformly irradiate the detection light DL to the first light receiving area A1 of the first light receiving part 31 and the second light receiving area A2 of the second light receiving part 32, the first light receiving part 31 is vertically installed at the inside surface of the horizontal part 10-1 of the body 10 to easily calculate the trigonometric function, and the second light receiving part 32 may be installed at the inside surface of the vertical part 10-2 of the body 10 in a horizontal direction.

However, the positions of the light emitting element 20, the first light receiving part 31, and the second light receiving part 32 are not limited thereto. For example, the first light receiving axis C1 of the first light receiving part 31 and the second light receiving axis C2 of tine second light receiving part 32 may be installed at the crossing angle K3 of 60° or the light emitting element 20, the first light receiving part 31, and the second light receiving part 32 may also be triangularly disposed to form a triangle with respect to one another.

The installation positions or the forms of the light emitting element 20, the first light receiving part 31, and the second light receiving part 32 may be very diverse depending on the shape of the body 10, the sensing place, or the sensing environment, the form of the target, or the like.

Further, the shape of the body 10 is also not limited to a shape bent at 90° and a structure in various forms bent at various angles may be applied.

Meanwhile, as illustrated in FIG. 17, the position sensing apparatus 500 according to some embodiments of the present invention may further include the height calculator 40 and the multi-position recognizer 50.

As a more detailed example, the multi-position recognizer 50 may be a micro processor, a circuit, or a program which receives the position and angle signals of the first target 1 from the first light receiving part 31 to output the positional information of the first target 1, receives the position and angle signals of the second target 2 from the second light receiving part 32 to output the positional information of the second target 2, and outputs the multi-position value for recognizing the first target 1 and the second target 2 as being separated from each other if the positional information of the first target 1 and the positional information of the second target 2 are out of the reference range.

For example, the case in which the positional information of the first target 1 and the positional information of the second target 2 are out of the reference range may be the case in which for example, when the crossing angle K3 of the angle line of the first target 1 measured by the first light receiving part 31 and the angle line of the second target 2 measured by the second light receiving part 32 is small, the signal intensity light-received by the first light receiving part 31 and the second light receiving part 32 is preferable to be reduced, but the signal intensity is not reduced but is rather strong.

FIGS. 18 and 19 are cross-sectional views illustrating an operation process of the multi-position sensing apparatus 500 of FIG. 15.

As illustrated in FIGS. 18 and 19, the operation process of the multi-position sensing apparatus 500 of FIG. 1 according to some embodiments of the present invention will be described as an example. First, as illustrated in FIG. 18, when the angle line (approximately 0°) of the first target 1 measured by the first light receiving part 31 and the angle line (approximately 90°) of the second target 2 measured by the second light receiving part 32 may intersect each other and the signal intensity is not changed, it may be determined that the positional information of the first target 1 and the positional information of the second target 2 approach the reference range by the height calculator 40 and the accurate height value of the first target 1 and the second target 2 may be calculated by the trigonometric function.

Meanwhile, as illustrated in FIG. 19, when the crossing angle of the angle line of the first target 1 measured by the first light receiving part 31 and the angle line of the second target 2 measured by the second light receiving part 32 is reduced and thus the signal intensity light-received by the first light receiving part 31 and the second light receiving part 32 is preferable to be reduced, but the signal intensity is not reduced but is rather strong, it is determined that the positional information of the first target 1 and the positional information of the second target 2 are out of the reference range by using the multi-position recognizer 50 and the multi position values for recognizing the first target 1 and the second target 2 as being separated from each other may be output.

Figure 20:
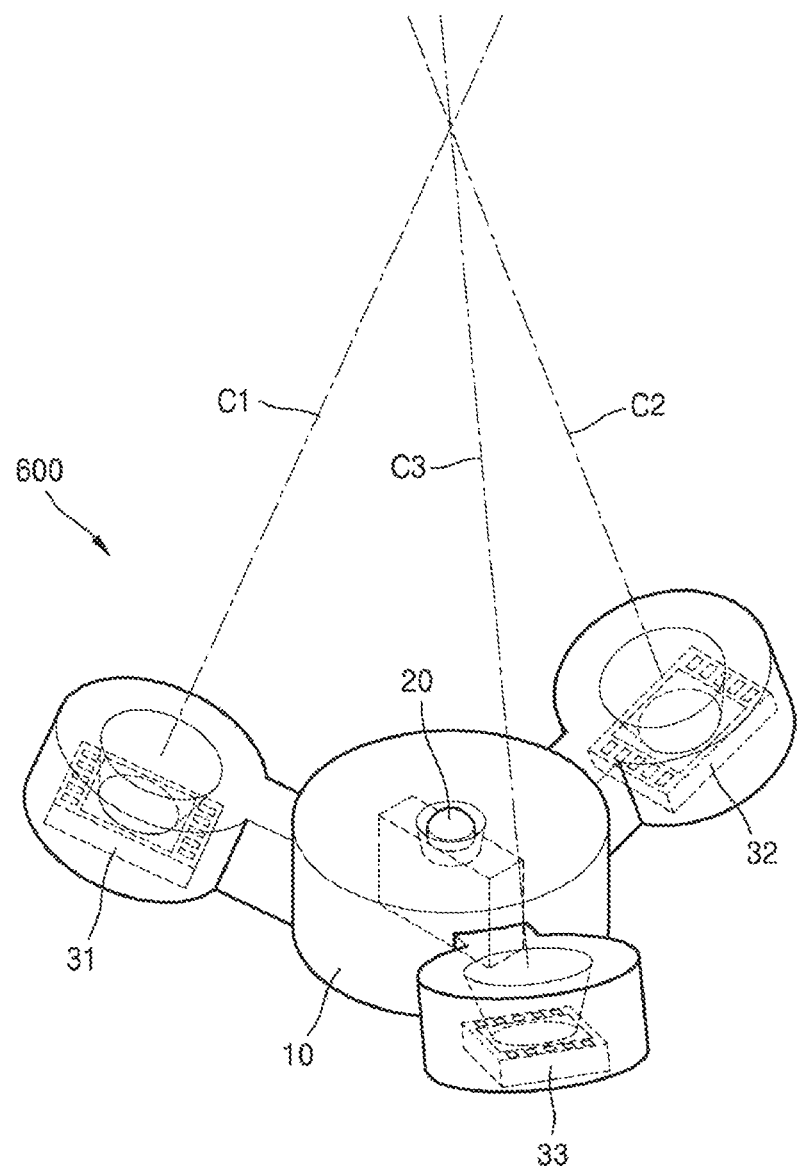
FIG. 20 is a perspective view illustrating a multi-position sensing apparatus according to some other embodiments of the present invention.

Therefore, when the user carries out the multi operations such as splaying or puckering fingers, the positions of each of the fingers are accurately determined as a plurality of points and thus the multi command input such as zoom in, zoom out, or the like may be implemented, FIG. 20 is a perspective view illustrating a multi-position sensing apparatus 600 according to some other embodiments of the present invention.

As illustrated in FIG. 20, the multi-position sensing apparatus 600 according to some other embodiments of the present invention may further include the third light receiving part 33 that is installed in the body 10 and has the third light receiving area in the third light receiving range angle with respect to a third light receiving axis C3 having the crossing angle to the first light receiving axis C1 to receive the first reflective light L1 or the second reflective light L2 reflected from the first target 1 or the second target 2, in addition to the first light receiving part 31 and the second light receiving part 32.

Here, to facilitate the calculation of the trigonometric function or the multi recognition, when viewed from the top, the first light receiving part 31, the second light receiving part 32, and the third light receiving part 33 may each be disposed at an equal angle of 120° with respect to the light emitting element 20.

Therefore, the multi position sensing apparatus 600 according to some other embodiments of the present invention may use a total of 3 light receiving parts such as the first light receiving part 31, the second light receiving part 32, and the third light receiving part 33 to perform the multi position recognition at all the angles of a front and back direction as well as a left and right direction, The installation number of light receiving parts is not limited to two or three as described above.

Figure 21:
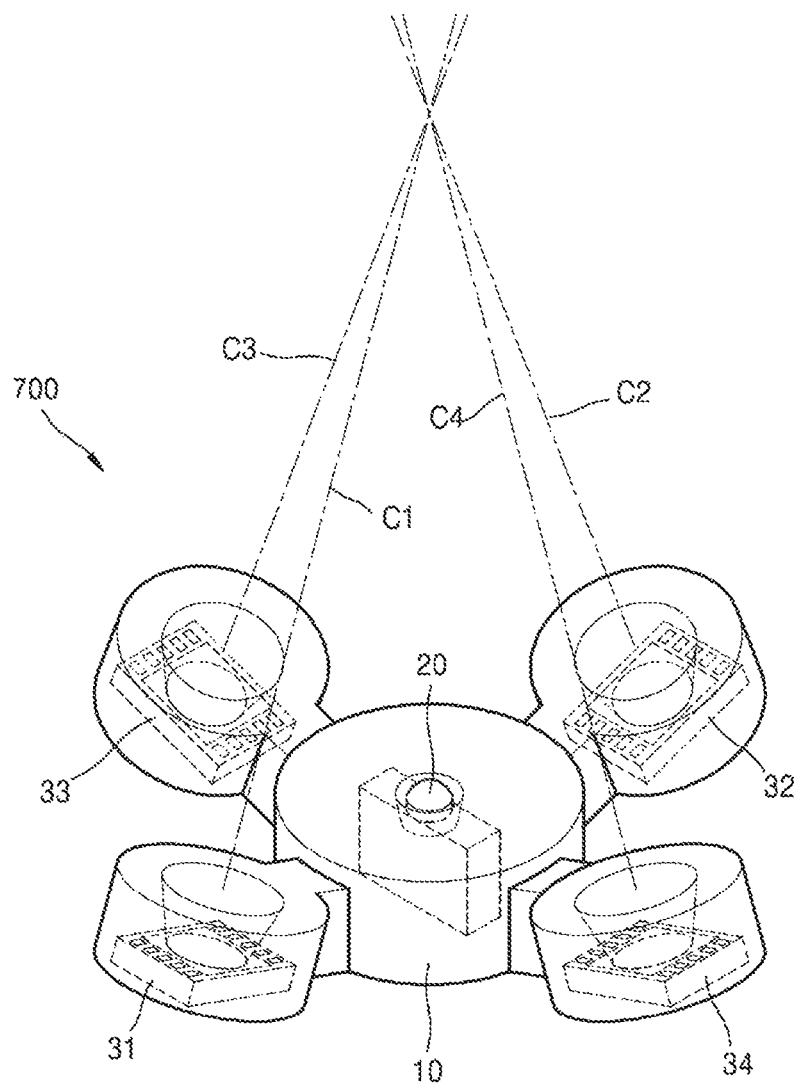
FIG. 21 is a perspective view illustrating a multi-position sensing apparatus according to some other embodiments of the present invention.

FIG. 21 is a perspective view illustrating a multi-position sensing apparatus 700 according to some other embodiments of the present invention, As illustrated in FIG. 21, the multi position sensing apparatus 700 according to some other embodiments of the present invention may further include the third light receiving part 33 that is installed in the body 10 and has the third light receiving area in the third light receiving range angle with respect to the third light receiving axis C3 having the crossing angle to the first light receiving axis C1 to receive the first reflective light L1 or the second reflective light L2 reflected from the first target 1 or the second target 2 and a fourth light receiving part 34 that is installed in the body 10 and has the fourth light receiving area in the fourth light receiving range angle with respect to the fourth light receiving axis C4 having the crossing angle to the first light receiving axis C1 to receive the first reflective light L1 or the second reflective light L2 reflected from the first target 1 or the second target 2, in addition to the first light receiving part 31 and the second, light receiving part 32.

Here, to facilitate the calculation of the trigonometric function or the multi recognition, when viewed from the top, the first light receiving part 31, the second light receiving part 32, the third light receiving part 33, and the fourth light receiving part 34 may each be disposed at an equal angle of 90° with respect to the light emitting element 20.

Therefore, the multi position sensing apparatus 700 according to some other embodiments of the present invention may use a total of 4 light receiving parts such as the first light receiving part 31, the second light receiving part 32, the third light receiving part 33, and the fourth light receiving part 34 to more accurately perform the multi position recognition at all the angles of a front and back direction as well as a left and right direction. In addition to this, the installation number, installation position, the disposition form, or the like of light receiving parts may be designed to be optimized depending on the form or the kind of targets or the form or the environment of the sensing area, or the like.

Although the present invention has been described with reference to with reference to the embodiments illustrated in the drawings, they are only examples. It will be appreciated by those skilled in the art that various modifications and equivalent other embodiments are possible from the present invention. Accordingly, the actual technical protection scope of the present invention must be determined by the spirit of the appended claims.

INDUSTRIAL APPLICABILITY

According to some of the embodiments of the present invention configured as described above, it is possible to more accurately determine the height value of the target and perform the multi-command inputs such as zoom in and zoom out by accurately determining the positions of each of the fingers even by the contactless scheme when the user carries out the multi operations such as splaying or puckering fingers, thereby increasing the use convenience of products.

The invention claimed is:

1. A multi-position sensing apparatus, comprising:
a light emitting element configured to irradiate detection light to a first or second target;
a first light receiving part including a first light receiving area in a first light receiving range angle with respect to a first light receiving axis to receive a first or second reflective light reflected from the first or second target; and
a second light receiving part including a second light receiving area in a second light receiving range angle with respect to a second light receiving axis in parallel to the first light receiving axis to receive the second or first reflective light reflected from the second or first target,
wherein the first light receiving part includes:
a first photo diode configured to use first barrier ribs having a height to change a transmitted amount of light depending on at least an angle and a plurality of first slits installed in parallel in a first direction to sense a light quantity of light transmitting between the first slits in the first area biased to one side and a quantity of light in a second area biased to the other side; and
a second photo diode configured to be adjacently installed to the first photo diode and to use second barrier ribs having a height to change the transmitted amount of light depending on at least the angle and a plurality of second slits installed in parallel in a second direction to sense a quantity of light transmitting between the second slits in a third area biased to one side and a quantity of light in a fourth area biased to the other side.

2. The multi-position sensing apparatus of claim 1, wherein a portion of the first light receiving area of the first light receiving part and a portion of the second light receiving area of the second light receiving part overlap with each other.

3. The multi-position sensing apparatus of claim 1, wherein the light emitting element comprises an infrared light emitting diode (LED) having a light emitting axis in parallel to the first light receiving axis.

4. The multi-position sensing apparatus of claim 1, further comprising:
a body, wherein the light emitting element is installed at a middle of an upper surface of the body, the first light receiving part is installed at one end portion of the upper surface of the body, and the second light receiving part is installed at the other end portion of the upper surface of the body.

5. A multi-position sensing apparatus, comprising:
a light emitting element configured to irradiate detection light to a first or second target;
a first light receiving part including a first light receiving area in a first light receiving range angle with respect to a first light receiving axis to receive a first or second reflective light reflected from the first or second target;
a second light receiving part including a second light receiving area in a second light receiving range angle with respect to a second light receiving axis in parallel to the first light receiving axis to receive the second or first reflective light reflected from the second or first target; and
a height calculator configured to receive position and angle signals of the first target from the first light receiving part to output positional information of the first target, to receive position and angle signals of the second target from the second light receiving part to output positional information of the second target, and to use a trigonometric function to calculate height values of the first target and the second target when the positional information of the first target and the positional information of the second target approach a reference range.

6. A multi-position sensing apparatus, comprising:
a light emitting element configured to irradiate detection light to a first or second target;
a first light receiving part including a first light receiving area in a first light receiving range angle with respect to a first light receiving axis to receive a first or second reflective light reflected from the first or second target;
a second light receiving part including a second light receiving area in a second light receiving range angle with respect to a second light receiving axis in parallel to the first light receiving axis to receive the second or first reflective light reflected from the second or first target; and
a multi-position recognizer configured to receive position and angle signals of the first target from the first light receiving part to output positional information of the first target, to receive position and angle signals of the second target from the second light receiving part to output positional information of the second target, and to output multi-position values for recognizing the first target and the second target as being separated from each other when the positional information of the target and the positional information of the second target are out of a reference range.

7. The multi-position sensing apparatus of claim 1, further comprising:
a third light receiving part including a third light receiving area in a third light receiving range angle with respect to a third light receiving axis in parallel to the first light receiving axis to receive the first reflective light or the second reflective light reflected from the first target or the second target,
wherein the first light receiving part, the second light receiving part, and the third light receiving part are each disposed at an equal angle of 120° with respect to the light receiving element.

8. The multi-position sensing apparatus of claim 1, further comprising:
a third light receiving part including a third light receiving area in a third light receiving range angle with respect to a third light receiving axis in parallel to the first light receiving axis to receive the first reflective light or second reflective light reflected from the first target or the second target; and a fourth light receiving part including a fourth light receiving area in a fourth light receiving range angle with respect to a fourth light receiving axis in parallel to the first light receiving axis to receive the first reflective light or the second reflective light reflected from the first target or the second target, wherein the first light receiving part, the second light receiving part, the third light receiving part, and the fourth light receiving part are each disposed at an equal angle of 90° with respect to the light receiving element.

9. The multi-position sensing apparatus of claim 1, wherein the first photo diode includes:

a first eccentric array that is installed under the first barrier ribs and is installed to be biased to one side with respect to central lines of each of the first slits and outputs signals having different intensities depending on the quantity of light; and a second eccentric array that is installed under the first barrier ribs and is installed to be biased to the other side with respect to the central lines of each of the first slits and outputs signals having different intensities depending on the quantity of light.

10. The multi-position sensing apparatus of claim 1, wherein the light emitting element comprises an infrared light emitting diode (LED) having a light emitting axis passing through an intersecting point of the first light receiving axis and the second light receiving axis.

11. The multi-position sensing apparatus of claim 1, further comprising:

a body configured to include a horizontal part and a vertical part, the body being bent at an angle of 90° on the whole, wherein the light emitting element is installed at an inside inclined part inclined at an angle of 45° between the horizontal part and the vertical part of the body, the first light receiving part is installed at an inside surface of the body, and the second light receiving part is installed at an inside surface of the vertical part of the body.

12. The multi-position sensing apparatus of claim 1, further comprising:

a third light receiving part including a third light receiving area in a third light receiving range angle with respect to a third light receiving axis intersected at a crossing angle to the first light receiving axis to receive the reflective light reflected from the first target.

13. The multi-position sensing apparatus of claim 1, further comprising:

a third light receiving part including a third light receiving area in a third light receiving range angle with respect to a third light receiving axis intersected at a crossing angle to the first light receiving axis to receive the reflective light reflected from the first target; and a fourth light receiving part including a fourth light receiving area in a fourth light receiving range angle with respect to a fourth light receiving axis intersected at a crossing angle to the first light receiving axis to receive the reflective light reflected from the first target.

14. The multi-position sensing apparatus of claim 5, wherein a portion of the first light receiving area of the first light receiving part and a portion of the second light receiving area of the second light receiving part overlap with each other.

15. The multi-position sensing apparatus of claim 5, wherein the light emitting element comprises an infrared light emitting diode (LED) having a light emitting axis in parallel to the first light receiving axis.

16. The multi-position sensing apparatus of claim 5, further comprising:

a body, wherein the light emitting element is installed at a middle of an upper surface of the body, the first light receiving part is installed at one end portion of the upper surface of the body, and the second light receiving part is installed at the other end portion of the upper surface of the body.

17. The multi-position sensing apparatus of claim 5, further comprising:

a body configured to include a horizontal part and a vertical part, the body being bent at an angle of 90° on the whole, wherein the light emitting element is installed at an inside inclined part inclined at an angle of 45° between the horizontal part and the vertical part of the body, the first light receiving part is installed at an inside surface of the body, and the second light receiving part is installed at an inside surface of the vertical part of the body.

18. The multi-position sensing apparatus of claim 6, wherein a portion of the first light receiving area of the first light receiving part and a portion of the second light receiving area of the second light receiving part overlap with each other.

19. The multi-position sensing apparatus of claim 6, wherein the light emitting element comprises an infrared light emitting diode (LED) having a light emitting axis in parallel to the first light receiving axis.

20. The multi-position sensing apparatus of claim 6, further comprising:

a body, wherein the light emitting element is installed at a middle of an upper surface of the body, the first light receiving part is installed at one end portion of the upper surface of the body, and the second light receiving part is installed at the other end portion of the upper surface of the body.

* * * * *